United States Patent Office 2,972,355
Patented Feb. 21, 1961

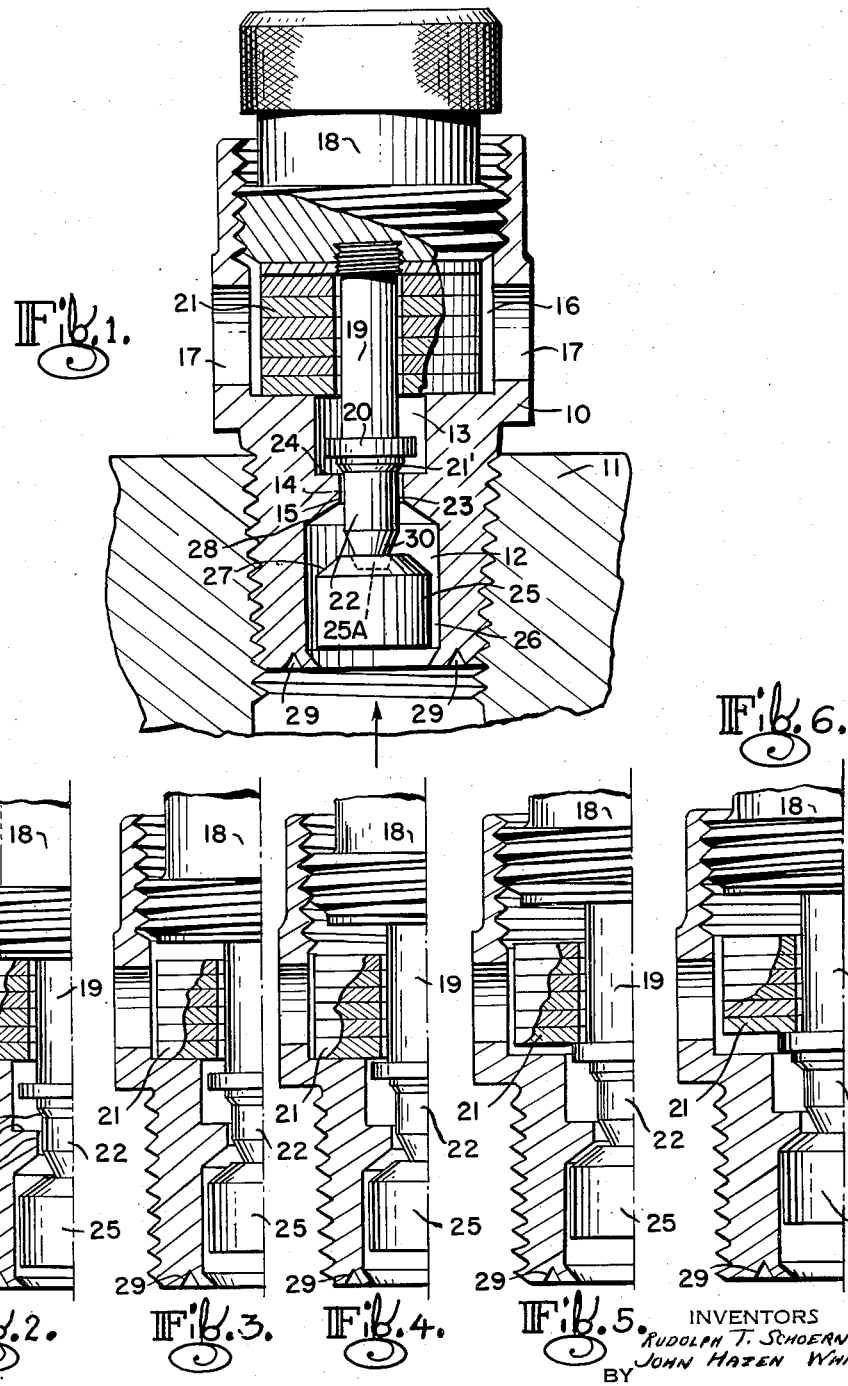

2,972,355

VENT VALVE WITH HYDROSCOPIC DISCS THEREIN

Rudolph T. Schoerner, Cranston, and John Hazen White, Barrington, R.I., assignors to Taco Heaters, Incorporated, Cranston, R.I., a corporation of New York Filed June 3, 1957, Ser. No. 663,228
2 Claims. (Cl. 137—197)

This invention relates to an automatically operating air vent valve allowing the passage of air therethrough and preventing the passage of water or similar liquid, said valve being especially adaptable for use in a heating system, or similar application wherein it is necessary to vent air or gas from a space and prevent the escape of water or similar liquid.

In heating system radiators, as an example, it is well known that it is necessary to vent the air or other gases produced in the system therefrom so that the heating fluid in the radiator will completely fill the radiator. This will give maximum heat transmission between the heating fluid, such as water, and the walls of the radiator. The water frequently contains dissolved air, or air can leak into the system in various manners and collect at the top of the radiators. Previously, manually operated valve arrangements have been employed for the purpose of venting the air from the radiators requiring each radiator to have its valve individually opened. There is seldom any systematic opening of the valves so that frequently air will be entrapped in the radiators and will remain for considerable periods of time before venting which will result in an inefficient operation of the system. Also, immediately after the radiators have been vented manually, it is possible that air will again become entrapped in the radiator because of some unusual occurrence in the heating system. A considerable period may elapse before the radiators are again vented to remove the trapped air.

Various automatic valves have been suggested, but these all have defects, one of the most important defects being the undesired escape of water from the radiator which may damage the floor or surrounding objects. Some of the valves require critical adjustments in assembly and in operation.

Another problem arising in the employment of such vents resides in the inability to disassemble the vent to clean it or replace perishable parts without at least partially draining the system to prevent the escape of liquid from the system to which the vent is applied.

One of the principal objects of this invention is to provide an automatically operating vent valve which will vent air from a heating, pumping or similar system but which will prevent the passage of water or other similar liquid therefrom.

Another object of the invention is to provide such an automatically operating vent valve which will permit ready disassembly to clean and/or replace perishable parts thereof without permitting the escape of water or other similar liquid from the system to which the vent is applied.

Another object of the invention is to provide an automatically operating vent valve embodying as a unitary construction, a fibrous body normally being pervious to air but substantially impervious to water upon becoming wet, and combined with a throttling element for restricting the passage of water from a system to the fibrous body at a controlled rate.

Another object of the invention is to provide such a vent including a housing and a sub-assembly that can be removed from the housing as a unit, including an adjusting cap or nut, a body of fibrous material and a throttling valve or pin.

Another object of the invention is to provide such a sub-assembly in an air vent valve in which the throttling pin cooperates with an auxiliary freely floating closure in a manner to control the flow of air and liquid past both the closure and throttling pin at a predetermined rate.

In one aspect of the invention, a vent body or housing may be provided with a chamber for receiving a body of fibrous material between the inlet and outlet thereof. The fibrous body preferably should be made of fibers capable upon wetting with water or the like, of swelling a major amount when unconfined. The swelling should be reasonably rapid so that when the fibrous body is confronted with water at a predetermined controlled rate, it is capable of swelling to close a passage to the atmosphere with sufficient rapidity to avoid leakage of water beyond the valve.

In a further aspect of the invention, a fiber can be employed, such as one of cellulose fiber normally used in the manufacture of paper or paper board and which has not been subsequently treated so as to reduce the swelling characteristics, such as by vulcanizing, such a fiber being termed herein an "untreated" cellulose fiber. A kraft process fiber is one example of such a fiber having unreduced swelling characteristics. Said body and fibers preferably are chosen to have at least a predetermined real volume in relation to the active or actual space occupied by the body and to have a predetermined swell rate when unconfined. With this aspect of the invention, the chamber for receiving the body of fibrous material may be closed by a cap or nut threaded into the housing. The cap or nut may include a pin extending through a hole in the fibrous body of greater diameter than the pin, and to the lower end of which pin, means may be provided of greater diameter than the hole through the fibrous body so that removal of the cap or nut withdraws the fibrous body with it.

In another aspect of the invention, a reduced diameter portion of the pin may be designed to cooperate with an orifice in the housing to throttle the passage of liquid from the system, to which the vent is applied, to the fibrous body so that the latter will swell and close the vent outlet to atmosphere before the liquid can reach the outlet.

In another aspect of the invention, a freely floating closure may be located within a chamber of the housing in such a way that the throttling stem will cooperate with the closure to effect its opening and closing and simultaneously regulate the flow of air and liquid past both the closure and throttling stem at a predetermined rate.

The aforementioned fibrous body when relatively dry may have intercommunicating pores therethrough which will be squeezed shut when the fibrous body absorbs water and the body is confined between the walls of a cavity or restraining structure.

When the fibrous body is restrained, the body will absorb only enough water to create a pressure sufficient to prevent a further passage of water. Thus, within certain limits, the valve will function independent of pressure in the radiator or system to be vented.

After the fibrous body has become impervious to the flow of water, there may be some evaporation from the outer portions, but this will be replenished by water passing the throttling pin at a controlled rate until air collects in the vent body. Thereafter, evaporation will continue until the fibrous body becomes pervious to air.

In a preferred form, the fibrous body fibers are in layers parallel to each other with a substantially random orientation of the fibers in said layers. The fibers are arranged substantially transverse to the passage of the water from the system.

The above as well as other objects, advantages and features of the invention will become apparent from the following description and drawings which are merely exemplary.

In the drawings:

Figure 1 is a sectional elevational view of an air vent to which the principles of the invention have been applied;

Fig. 2 is a partial sectional elevational view of the vent of Fig. 1 in a closed position;

Fig. 3 is a view similar to Fig. 2 with the cap or nut unscrewed one turn;

Fig. 4 is similar to Fig. 3 with the nut unscrewed two turns;

Fig. 5 is similar to Fig. 3 with the nut unscrewed two and one-half turns; and

Fig. 6 is similar to Fig. 3 with the nut unscrewed two and three-quarters turns.

Referring to the drawings, a housing 10 may be threaded into the wall 11 of a radiator or the like in a hot water system. The housing 10 may be provided with an inlet chamber 12 that is in communication with a chamber 13 through an orifice 14 formed in a wall 15 between the chambers 12 and 13. The chamber 13 may open into a chamber 16 within the housing 10. A plurality of radially disposed outlet ports 17 may be equally spaced about the periphery of the housing 10, and lead to the atmosphere.

A nut or cap 18 may be threaded into the housing 10, and it may have removably fixed to it by screw threads, or the like, a pin 19. The pin 19 may be provided with a collar or flange 20 of greater diameter than itself, and a tapered surface 21' may be located on the upstream side of collar 20, all for a purpose to be described later.

A fibrous body 21 may include a plurality of stacked circular discs or washer-like elements preferably made from a kraft process fiber, although other similar fibers can be used. In one type of satisfactory fibrous body, the fiber is medium well cooked and beaten, and the board made on a wet machine. The fibers preferably are arranged in parallel layers, said layers preferably having the fibers randomly oriented in each layer. Fibrous bodies found to be satisfactory may have apparent densities of from 0.80 to 1.40, and, an initial swell rate for the first minute of more than 20% when exposed to water and when the body is unrestrained. As one example of a suitable fiber, the initial swell rate is 20% for the first minute. The same fiber will swell 70% in five minutes. This fiber is a kraft process fiber made as indicated. The swell rate is not necessarily a straight line relationship but should be rapid or quick the first minute. The particular swell rate also is related to the real volume of the fibers. The fibrous body may be made up of a plurality of wafers or washers suitably shaped to fit within chamber 16. When first placed in the chamber 16 it is not entirely essential that the body completely fills the same, but after once becoming wet, the fibrous body extends between opposite faces thereof. When there is no water in contact with the fibrous body and after it has had time to dry, at least partially, the fibrous body becomes pervious to air. This is apparently due to the creation of interstices between the various fibers by the shrinkage. This permits the passage of air or gas from the inlet passageway through the fibrous body to the outlet passageways of the valve. When water flows at a controlled rate into contact with the body 21, the fibers in the fibrous body will swell to close the interstices and cause the body to become impervious to the passage of water before water can flow through so as to flow onto the floor or surrounding objects. When a plurality of wafers are used, the air may pass out between the wafers as well as through them.

A sub-assembly may be formed by loading the desired number of fibrous washers, forming the body 21, onto the pin 19 before screwing the pin 19 to the nut 18. In this way, the entire sub-assembly including nut 18, body 21 and pin 19 may be removed as a unit when it is desired to clean the vent or replace the body 21. Flange 20 has an outer diameter larger than the diameter of the bore through the fibrous washers so that it retains the fibrous body 21 on pin 19 even when the entire sub-assembly is removed.

The pin 19 upstream from the body 21 may include a cylindrical portion 22 having a diameter to provide with the diameter of the orifice 14, an annular passage 23 that will effect a greatly restricted flow of water therethrough. The relationship of the annular passage 23 about the cylindrical portion 22 of pin 19 is such that the amount of water passed through passage 23 during use will be just sufficient to effect swelling of the body 21 to close off the outlet ports 17 from the chamber 16 without permitting water to reach said ports 17. Accordingly, this annular passage 23 bears a definite relationship to the material employed for the fibrous body 21 and, of course, will vary with different materials.

The tapered surface 21' of the pin 19 may cooperate with a peripheral edge 24 of the orifice 14 so that in initially opening the vent in use, a sudden rush of air and/or of water will not adversely affect the fibrous body 21. Accordingly, a controlled rate of flow of fluid through the annular passage 23 is provided.

As previously explained, the end of the housing 10 that is threaded into the radiator wall 11 is provided with a chamber 12, and a freely floating closure member 25 may be located therein. This member 25 is of a diameter such that a controlled annular passage 26 is provided between it and the interior walls of the chamber 12. The downstream end of the closure 25 is provided with a tapered surface 27 that may cooperate with a mating seat 28 formed on the upstream wall in which the orifice 14 is located. The upstream end of the housing 10 may be upset at a plurality of points 29 during assembly so as to retain the freely floating closure 25 within the chamber 12.

The upstream end of the pin 19 may be provided with a taper 30, and its extreme end may abut the downstream end of the closure 25 when the latter is forced thereagainst by the pressure of air and/or water within the radiator. A recess 25a may be provided in the end of float or closure member 25 which receives the bottom end of taper 30 on reduced portion 22. The coaction between the end of taper 30 and the recess in the top of the float results in the proper positioning or centering of float 25 so that when the sub-assembly is removed from the body, the top tapered surface of float 25 engages the tapered surface on the body to close orifice 14.

The rate of fluid flow to the fibrous body is controlled primarily by cooperation of cylindrical portion 22 of pin 19 with orifice 14 to restrict the flow of water through orifice 14 to an amount to effect swelling of the fibrous body 21 to close off ports 17 before any water reaches them. For example, the difference in diameters between portion 22 and orifice 14 may be less than about .003". During continued unscrewing of nut 18, the rate of water flow through orifice 14 will remain constant due to the cylindrical nature of portion 22.

When it is desired to remove the sub-assembly including nut 18, the freely floating closure 25 moves downstream toward the seat 28. By virtue of the taper 30 at the upstream end of pin 19, just as the closure 25 seats on seat 28, an increased flow of air and/or water passes through orifice 14, which may tend to clean any foreign matter or particles that might otherwise become lodged between the closure 25 and the seat 28.

The arrangement also can be used without the closure 25 and without collar 20. Various other modifications can be made in the details of construction described here-

What is claimed is:

1. An automatic air vent valve including a valve body, said body having a chamber therein extending inwardly from an end of said body, the walls of said chamber having apertures opening to the exterior of the body; an inlet passageway in said body; a cylindrical bore connecting said inlet passageway and said chamber; a water absorbent fibrous body in said chamber, said fibrous body having a central aperture therethrough, said central aperture being larger than said bore; a cap threadedly engageable in said chamber; a pin means projecting inwardly from said cap through said central aperture of the fibrous body, said pin means being removably attached to said cap, said pin means having a smaller diameter portion connected thereto by a tapered portion; the smaller diameter portion extending through and beyond said bore and cooperating therewith to control flow therethrough; said tapered portion being cooperable with the upper circumferential edge of said bore to adjustably control flow therethrough; said inlet passageway including a second chamber below said bore having a diameter larger than said bore and connected thereto by an angularly disposed portion; a free float in said second chamber abutting the upstream end of said smaller diameter portion and having an angularly disposed upper surface adapted to contact the angularly disposed connecting portion between said bore and said chamber so as to close off said bore when said cap is removed from said valve body, said float being urged upwardly by the pressure in said second chamber; and means on said pin means for engaging said fibrous body when said cap is removed from said valve body so as to assure the positive removal of said fibrous body when said cap is removed.

2. An automatic air vent valve including a valve body, said body having a chamber therein extending inwardly from an end of said body, the walls of said chamber having apertures opening to the exterior of the body; an inlet passageway in said body; a cylindrical bore connecting said inlet passageway and said chamber; a water absorbent fibrous body in said chamber, said fibrous body having a central aperture therethrough, said central aperture being larger than said bore; a cap threadedly engageable in said chamber; a pin means projecting inwardly from said cap through said central aperture of the fibrous body, said pin means having a smaller diameter portion connected thereto by a tapered portion; the smaller diameter portion extending through and beyond said bore and cooperating therewith to control flow therethrough; said tapered portion being cooperable with the upper circumferential edge of said bore to adjustably control flow therethrough; said inlet passageway including a second chamber below said bore having a diameter larger than said bore and connected thereto by an angularly disposed portion; a free float in said second chamber abutting the upstream end of said smaller diameter portion and having an angularly disposed upper surface adapted to contact the angularly disposed connecting portion between said bore and said chamber so as to close off said bore when said cap is removed from said valve body, said float being urged upwardly by the pressure in said second chamber; and a recess in the top of said float for receiving the bottom end of said reduced portion so that said float will be properly positioned relative to said angularly disposed portion between said bore and said second chamber.

References Cited in the file of this patent

UNITED STATES PATENTS

| | | |
|---|---|---|
| 2,153,726 | Scoppola | Apr. 11, 1939 |
| 2,314,963 | Zelnis | Mar. 30, 1943 |
| 2,331,431 | Simoneau | Oct. 12, 1943 |
| 2,467,217 | Mikeska | Apr. 12, 1949 |
| 2,685,294 | Gold et al. | Aug. 3, 1954 |
| 2,723,676 | Thrush | Nov. 15, 1955 |

FOREIGN PATENTS

| | | |
|---|---|---|
| 37,014 | France | June 3, 1930 |
| 517,966 | Canada | Nov. 1, 1955 |